United States Patent
Srinivasan et al.

(10) Patent No.: US 7,209,925 B2
(45) Date of Patent: Apr. 24, 2007

(54) METHOD, SYSTEM, AND ARTICLE OF MANUFACTURE FOR PARALLEL PROCESSING AND SERIAL LOADING OF HIERARCHICAL DATA

(75) Inventors: Sriram Srinivasan, Sunnyvale, CA (US); Qi Jin, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/647,997

(22) Filed: Aug. 25, 2003

(65) Prior Publication Data

US 2005/0049996 A1 Mar. 3, 2005

(51) Int. Cl.
*G06F 17/30* (2006.01)
(52) U.S. Cl. ............... 707/101; 707/10; 707/200
(58) Field of Classification Search .............. None
See application file for complete search history.

(56) References Cited

U.S. PATENT DOCUMENTS

| | | | | |
|---|---|---|---|---|
| 5,852,812 | A * | 12/1998 | Reeder | 705/39 |
| 6,125,391 | A * | 9/2000 | Meltzer et al. | 709/223 |
| 6,151,624 | A * | 11/2000 | Teare et al. | 709/217 |
| 6,502,101 | B1 | 12/2002 | Verprauskus et al. | |
| 6,556,999 | B1 * | 4/2003 | Kloos et al. | 707/10 |
| 6,947,950 | B2 * | 9/2005 | Murthy et al. | 707/103 R |
| 6,965,903 | B1 * | 11/2005 | Agarwal et al. | 707/104.1 |
| 6,996,571 | B2 * | 2/2006 | McConnell | 707/101 |
| 7,003,531 | B2 * | 2/2006 | Holenstein et al. | 707/201 |
| 2002/0099715 | A1 | 7/2002 | Jahnke et al. | |
| 2002/0112224 | A1 | 8/2002 | Cox | |
| 2002/0133484 | A1 | 9/2002 | Chau et al. | |
| 2002/0156811 | A1 | 10/2002 | Krupa | |
| 2002/0169788 | A1 | 11/2002 | Lee et al. | |
| 2002/0174379 | A1 | 11/2002 | Korenevsky et al. | |
| 2003/0023633 | A1 | 1/2003 | Ross | |
| 2003/0065656 | A1 | 4/2003 | de la Torre et al. | |
| 2003/0101194 | A1 | 5/2003 | Rys et al. | |

OTHER PUBLICATIONS

Nicola, M. and John, J. 2003. XML parsing: a threat to database performance. In Proceedings of the Twelfth International Conference on information and Knowledge Management (New Orleans, LA, USA, Nov. 3-8, 2003). CIKM '03. ACM Press, New York, NY, 175-178. DOI= http://doi.acm.org/10.1145;/956863.956898.*

Deutsch, A., Fernandez, M., and Suciu, D. 1999. Storing semistructured data with STORED. In Proceedings of the 1999 ACM SIGMOD international Conference on Management of Data (Philiadelphia, Pennsylvania, United States, May 31-Jun. 3, 1999). SIGMOD '99. ACM Press, New York, NY, 431-442. DOI= http://doi.acm.org/10.1145/304182.304220.*

(Continued)

*Primary Examiner*—Jeffrey Gaffin
*Assistant Examiner*—Mark Andrew X Radtke
(74) *Attorney, Agent, or Firm*—Janaki K. Davda; Konrad Raynes & Victor LLP

(57) ABSTRACT

A technique is provided for loading input data in one or more hierarchical format input files into a data store. Parallel processing of one or more input files is performed to output data. The data is serially loaded into the data store while enforcing the order of the data in the one or more input files. Each input file may be a physical file or a logical file.

25 Claims, 13 Drawing Sheets

OTHER PUBLICATIONS

Tatarinov, I., Viglas, S. D., Beyer, K., Shanmugasundaram, J., Shekita, E., and Zhang, C. 2002. Storing and querying ordered XML using a relational database system. In Proceedings of the 2002 ACM SIGMOD international Conference on Management of Data (Madison, Wisconsin, Jun. 3-6, 2002). SIGMOD '02. ACM Press, New York, NY, 204-215.*

Gustafson, J.L. Originally published in Communications of the ACM 31(5), 1988, pp. 532-533. Reevaluating Amdahl's Law. Available online at http://www.scl.ameslab.gov/Publications/Gus/AmdahlsLaw/Amdahls.html.*

Liao, H. Jul. 17, 2003. Using the IBM Red Brick Warehouse Backup and Restore System. Available online at http://www.128.ibm.com/developerworks/db2/zones/informix/library/techarticle/0307liao/0307liao.html?no%20frames=true.*

Oracle9i Application Developer's Guide—Large Objects (LOBs), Release 2 (9.2). LOBS: Best Practices. Copyright 2002. Available online at http://www.utexas.edu/its/unix/reference/oracledocs/v92/B10501_01/appdev.920/a96591/adl09bes.htm.*

Nicola, M. and van der Linden, B. 2005. Native XML support in DB2 universal database. In Proceedings of the 31st international Conference on Very Large Data Bases (Trondheim, Norway, Aug. 30-Sep. 2, 2005). Very Large Data Bases. VLDB Endowment, 1164-1174.*

U.S. Appl. No. 10/234,876, filed on Aug. 30, 2002, entitled "*System, Method, and Computer Product for Querying XML Documents Using a Relational Database System,*" invented by E. Shekita and J. Shanmugasundaram.

Microsoft Corporation. Product/Solution: Microsoft SQL Server/SQLXML "*Performing Bulk Load of SML Data,*" 2 pages [online]. Retrieved from http://msdn.microsoft.com/library/default.asp?url=library/en-us/sqlxml3/htm/bulkload_7pv).asp.

*SAX 2.0: The Simple API for XML*, 1 page [online]. Retrieved from http://www.megginson.com/SAX/index.html.

*W3C's Extensible Markup Language (XML)*, 3 pages [online]. Retrieved from http://w3.org/XML.

*Xerces C++SML Parser*, 1 page [online] Retrieved from http://xml.apache.org/xerces-c/index.html.

Shanmugasundaram, J, et al. *A General Technique for Querying XML Documents Using a Relational Database System*, SIGMOD Record, vol. 30, No. 3, Sep. 2001, pp. 20-26.

IEEE Computer Society. András Belokosztolski, et al. *An XML Based Framework for Self-Describing Parallel I/O Data*. Proceedings of the Eleventh Euromicro Conference on Parallel, Distributed and Network--Based Processing (Wuro-PDP'03), 8 pages.

IEEE Computer Society, Kevin Lü, et al. *Parallel Processing XML Documents*. Proceedings of the International Database Engineering and Applications Symposium (IDEAS'02), 10 pages.

IBM Corporation. *Table Management Utility. Reference Guide. IBM Brick Warehouse*. Chapter entitled Loading Data into a Warehouse Language (XML). Version 6.2, Aug. 2002, Part. No. 000-9055 [online] Retrieved from http:www-3.ibm.com/software/data/informix/pubs/library/interim/9055-pdf.html, 408 pages.

* cited by examiner

| Input File Number | Input File Location | Offset | Spillfile Location | State | Rows Processed | Lines/ Characters or Bytes Processed | Header Text | Footer Text |
|---|---|---|---|---|---|---|---|---|
| | | | | | | | | |

FIG. 10

METHOD, SYSTEM, AND ARTICLE OF MANUFACTURE FOR PARALLEL PROCESSING AND SERIAL LOADING OF HIERARCHICAL DATA

BACKGROUND OF THE INVENTION

1. Field of the Invention

The present invention is directed to parallel processing of input data and serial loading of the processed hierarchical data.

2. Description of the Related Art

Data in Extensible Markup Language (XML) format ("XML data") allows applications to exchange data, for example, for integration purposes. Frequently, there is need for XML data to be stored in relational tables in databases (i.e., an example of a data store). Parsing XML data and extracting data elements is resource intensive, any loading of XML data may be very slow. In many cases, the parsing of XML data causes a bottleneck when a high volume of XML data needs to be processed.

Current database systems and applications rely on external scripts and/or Extract, Transform and Load (ETL) programs to load XML data into a database. Unfortunately, external scripts and ETL programs are unable to interact with the core database system through which the database may be accessed. Therefore, the external scripts and ETL programs work through established programming interfaces to load data into the database. These external programs are also serial processors of XML data, and hence are likely to show poor (e.g., slow) performance in high volume situations. Moreover, current solutions are unlikely to be easily customizable. In addition, current solutions typically provide minimal support for error correction and restartability of operations. The fact that XML parsing tends to be resource (e.g., time and memory) consuming adds to the poor performance of current solutions, especially in bulk data load situations.

A "shredding" process is a process of identifying data elements present in XML data and of assembling the data elements into flat tuples (i.e., "records" or "rows") that may be inserted into a table of a database. Current solutions use client side shredding processes, which have poor performance (e.g., they are very slow). The current solutions generally involve the generation of Structured Query Language (SQL) INSERT statements by client programs, and then the SQL INSERT statements are executed to inserts tuples into a database through a client Application Programming Interface (API), such as JAVA® Database Connectivity (JDBC) like JDBC or Open Database Connectivity (ODBC).

In UPSERT type operations, SQL generation becomes more difficult for client programs because the client programs have to query the database for an object's existence and then generate either an UPDATE SQL statement or an INSERT SQL statement. UPSERT operations may be performed to load data ("input rows") into a table. In a typical UPSERT operation, when an input row matches a primary key of an existing row in a table, that input row is designated as an update row and is used to update a matched existing row, and when the input row has a new primary key, the input row is designated as an insert row and is inserted into the table. Again, these client side solutions do not work very well in bulk loads, especially for error handling and load restartability.

On the other hand, many database systems implement a special program referred to as a "database loader" to transfer large volumes of data into a database. For example, one loader program is a Red Brick® Table Management Utility (TMU) for the IBM® Red Brick® Warehouse, a relational database optimized for dimensional analysis. For more information on the TMU, see the IBM® RedBrick® Table Management Utility (TMU) Reference Guide Version 6.2 available from International Business Machines Corporation.

A typical database loader has knowledge of the internal structures of the database and has direct access to the physical storage areas of the database. A database loader typically allows data to be loaded into a database in flat or delimited formats. Delimited formats are those in which field values in each row of an input file are separated by special characters (e.g., '|') and each row is separated by another special character (e.g., carriage return/line feed). Flat formats are those in which the field values are of exact lengths and, hence, the entire row is of an exact length. A database loader also provides other functionalities, such as, duplicate handling, optimized index building, enforcing referential integrity, and maintaining materialized views defined on the table. These other functionalities are not easily available to existing client side solutions. Additionally, most database loaders also run in parallel configurations.

Thus, there is a need in the art for improved loading of hierarchically structured data (e.g., XML data) into a database.

SUMMARY OF THE INVENTION

Provided are a method, system, and article of manufacture for loading input data in one or more hierarchical format input files into a data store. Parallel processing of one or more input files is performed to output data. The data is serially loaded into the data store while enforcing the order of the data in the one or more input files.

The described implementations of the invention provide a method, system, and program for a procedure, that under the control of a master row mapper and an extension to a database loader, can process data in parallel from hierarchical format input files (e.g., XML files), and load the processed data into target tables in a relational database, in such a manner as to preserve the order of appearance of extracted data in the input files. Also provided is a scheme to correctly identify errors in processing and amend processing to work around these errors. The described implementations of the invention also provide a way to later restart interrupted loads of data, from the point where processing was terminated earlier. The described implementations of the invention incorporate the use of one or more row mapper processes that parse input files in parallel and optionally use temporary storage locations (e.g., spillfiles) to preserve ordering and enable error identifications and corrections.

BRIEF DESCRIPTION OF THE DRAWINGS

Referring now to the drawings in which like reference numbers represent corresponding parts throughout:

FIG. 10 illustrates a task table in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1:
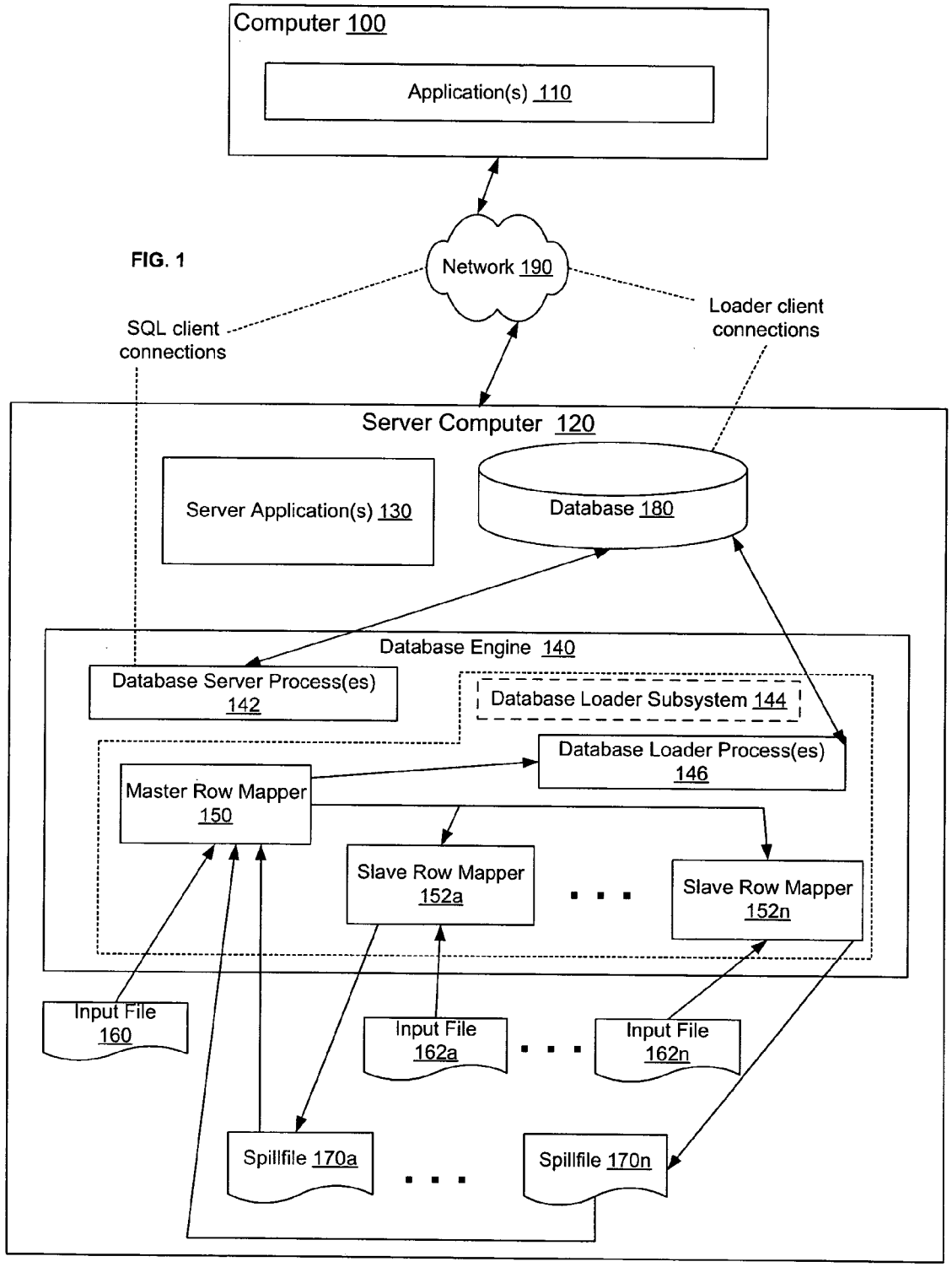
FIG. 1 illustrates, in a block diagram, a computing environment in accordance with certain implementations of the invention.

FIG. 1 illustrates, in a block diagram, a computing environment in accordance with certain implementations of the invention. A computer 100 executes one or more applications 110. An application 110 may be any type of application program. The computer 100 may be a client computer, a server computer, an operator console, or any other computer. The computer 100 is connected to a server computer 120 by a network 190, such as a local area network (LAN), wide area network (WAN), or the Internet. The Internet is a world-wide collection of connected computer networks (i.e., a network of networks).

The applications 110 may access data managed by the server computer 120 by issuing queries (e.g., SQL queries) to the server computer 120. The server computer 120 includes one or more server applications 130. A server application 130 may be any type of application program.

Moreover, the server computer 120 includes a database engine 140 and a database 180 (ie., an example of a data store). The database engine 140 includes one or more database server processes 142 that may access the database 180 and a database loader subsystem 144. The database loader subsystem 144 includes one or more database loader processes 146 that load data into the database 180. The database loader subsystem 144 also includes a master row mapper 150 that takes input file 160 in a certain hierarchical format (e.g., XML), creates tuples, and forwards the tuples to the database loader processes 146. Although examples herein will refer to XML data, the techniques of the invention are applicable to other types of data formats that are organized in a hierarchical manner. Input file 160 may be in the form of a file, a data set, or any other form, but, for ease of reference, the term "input file" will be used herein to encompass input in any form, and the term "input data" will be used herein to refer to the content of the input file.

In certain implementations of the invention, data sources in hierarchical format could include "internal" data obtained from object/object relational databases, hierarchical databases, cursor results from SQL queries, data from multiple queues etc. These data sources may be accessed using, for example, system-interconnections. In certain implementations of the invention, multiple operating system (OS) "named pipes" may be used to connect a data source to a row mapper 150, 152*a* . . . 152*n*, without performing sectioning as there would not be a physical file to split up. Parallelism may be achieved with the use of the individual multiple input streams.

The master row mapper 150 also invokes zero or more slave row mappers 152*a* . . . 152*n*. For ease of reference, ellipses, as well as "a" and "n", appended to a figure reference are used to indicate that any number of that item may be included in implementations of the invention. For example, zero or more slave row mappers may be invoked. Each slave row mapper 152*a* . . . 152*n* processes input files 162*a* . . . 162*n* to create tuples and forwards the tuples to a spillfile 170*a* . . . 170*n*. For example, slave row mapper 152*a* processes input file 162*a* to create tuples that are sent to spillfile 170*a*, and slave row mapper 152*n* processes input file 162*n* to create tuples that are sent to spillfile 170*n*. The master row mapper 150 forwards the tuples in spillfiles 170*a* . . . 170*n* to the database loader processes 146. The input files 160 and 162*a* . . . 162*n* may be physical files or logical files (i.e., a section of a physical file).

Although multiple slave row mappers 152*a* . . . 152*n* are illustrated in FIG. 1, implementations of the invention may include zero or more slave row mappers. Also, each slave row mapper may process more than one input file.

Also, although the row mappers are illustrated within the database engine 140 and separate from the database loader processes 146, the row mappers may be implemented outside of the database engine 140 at server computer 120 or as part of the database loader processes 146. In alternative implementations, the row mappers may also reside at computer 100.

Implementations of the invention process hierarchical format input data (e.g., XML data) in a parallel manner. Also, implementations of the invention extend a database loader to load the processed data into a database serially, without requiring the generation of SQL commands.

Implementations of the invention provide a parallel shredding process that enhances performance by shredding input data of multiple input files or one large input file at the same time, with the order of the input data maintained. Creating a database loader subsystem to perform parallel shredding and serial loading of input data provides an improved and tightly integrated solution for loading bulk input data into a database.

Figure 2:
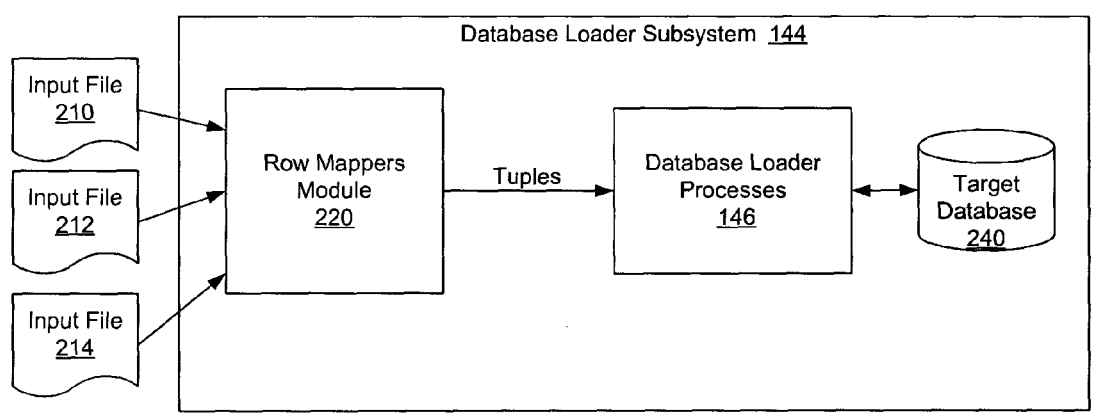
FIG. 2 illustrates, in a block diagram, a database loader subsystem in accordance with certain implementations of the invention.

FIG. 2 illustrates, in a block diagram, a database loader subsystem 144 in accordance with certain implementations of the invention. Certain implementations of the invention provide a row mappers module 220 to process input data (e.g., XML data). The row mappers module 220 includes master row mapper 150 and zero or more slave row mappers 152*a* . . . 152*n*. The row mappers module 220 is positioned prior to the data input phase of the database loader processes 146 and executes a master and zero or more slave row mappers to perform parallel shreds. The database loader processes 146 perform, for example, data storage and indexing. The row mappers module 220 may also work with client-side ETL processes, where the row mappers module 220 is used as one of the "filter" processes used prior to the data input phases.

The row mappers 220 module parses and maps input data from one or more input files 210, 212, and 214 and constructs flat tuples as inputs to the database loader processes 146. The tuples may be in a flat format, either with fields fixed by length and position, or with fields delimited by a separator string. The row mapper module 220 sends the formatted flat rows into the load stream of the database loader processes 146. The database loader processes 146 then processes each flat row, performing all of its regular operations, such as index lookups, duplicate handling, and data and index storage.

Figure 3:
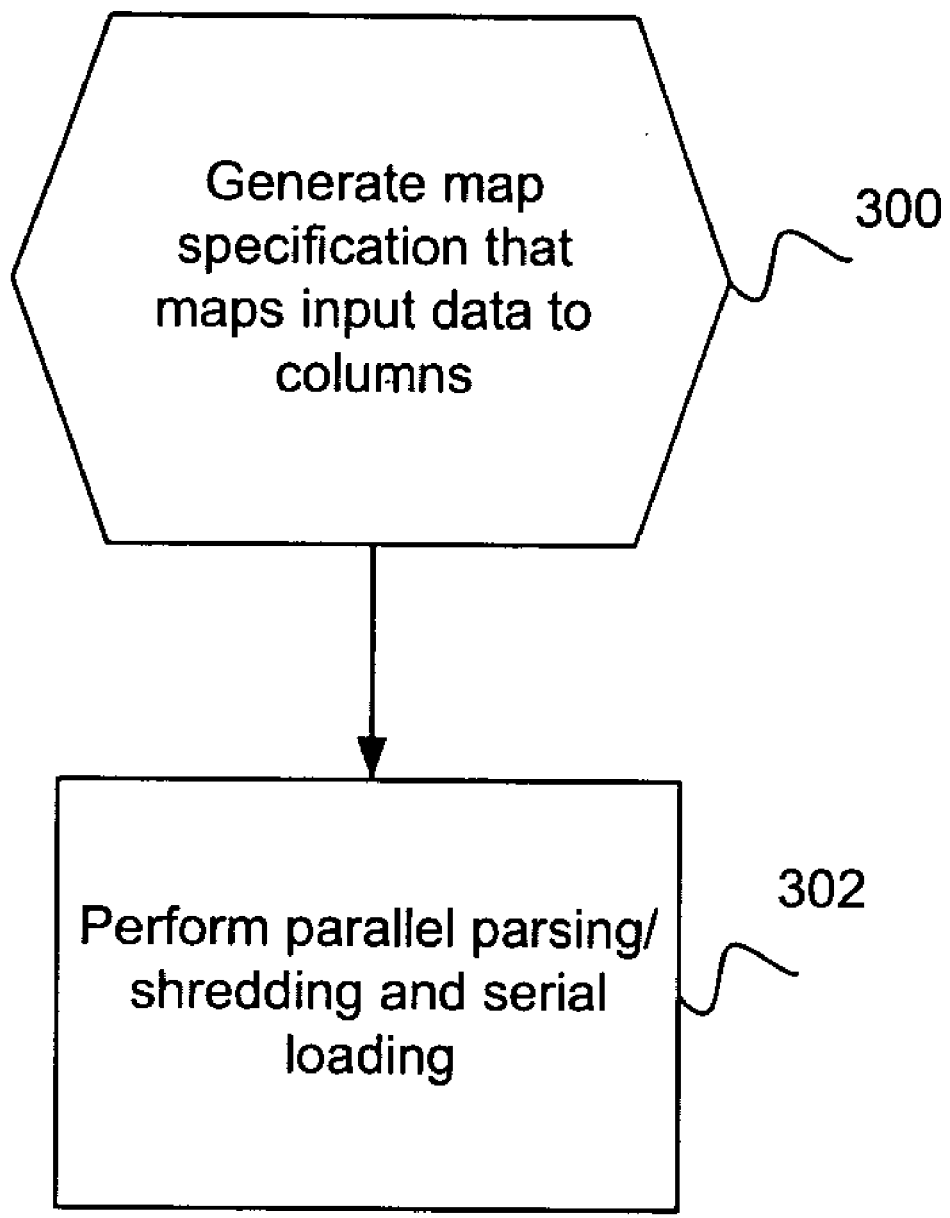
FIG. 3 illustrates logic for loading input data into a database in accordance with certain implementations of the invention.

FIG. 3 illustrates logic for loading input data into a database in accordance with certain implementations of the invention. Control begins at block 300 with generation of a map specification that maps input data (e.g., XML elements) to columns of a table (e.g., SQL columns) in the database. For example, there are many techniques that may be used with implementations of the invention to identify individual data elements in an XML document. There are also many different map syntaxes that may be used to depict the relationship between XML data elements and target SQL columns. Examples of XML data element identification notations and XML to SQL mappings will be provided for better understanding of the invention, but it is not intended that the invention be limited to XML or SQL.

XML data has a hierarchical structure. In certain implementations of the invention, the row mapper module 220 identifies each XML data element by its location in its hierarchical structure (i.e., by its "XML path"), which is similar to identifying a file in a directory tree structure by its file path. Example (1) provides a sample XML data fragment:

```
<CLOTHES>                                    Example (1)
    <ITEM TYPE="Shirt">
        <STYLE ID="Polo">
            <SLEEVES TYPE="Full"/>
            <SIZE>Small</SIZE>
            <COLOR>Green</COLOR>
        </STYLE>
    </ITEM>
</CLOTHES>
```

The XML path of /CLOTHES/ITEM/STYLE/SLEEVES/SIZE/#PCDATA refers to the XML data element "Small". The expression #PCDATA indicates that the XML element to which the XML path refers is the Parsed Character Data element under the SIZE element. The XML path of /CLOTHES/ITEM/STYLE/SLEEVES/@TYPE refers to the value "Full" of the XML attribute TYPE. The "@" symbol indicates an XML attribute.

As for the map specification, a collection of XML paths is used to represent a tuple and can be mapped to different columns in a relational table. Example (2) illustrates an XML items to SQL columns map specification:

```
item_type    /CLOTHES/ITEM/@TYPE                      Example (2)
style_id     /CLOTHES/ITEM/STYLE/@ID
sleeve_type  /CLOTHES/ITEM/STYLE/SLEEVES/
             @TYPE
size         /CLOTHES/ITEM/STYLE/SIZE/#PCDATA
color        /CLOTHES/ITEM/STYLE/COLOR/
             #PCDATA
```

The map specification results in the identification of a largest leading XML path fragment common to all the XML paths. For ease of reference, this XML path fragment is termed a "processing unit." For example (2) above, the largest leading common XML path fragment is /CLOTHES/ITEM, which is the processing unit for this map specification. The processing unit defines the row separators, which means that the XML data values obtained within the context of one processing unit fragment (i.e. between the open and close tags for an XML item) are sufficient to assemble one relational tuple.

Example (3) illustrates XML content with two processing units. Although the terms "XML data" and "XML content" are often used interchangeably, for ease of understanding, the term "XML data" may be used herein to refer to tuple data obtained from XML (e.g., data element values that are retrieved from the XML document), and the term "XML content" may be used herein to refer to text streams or an input file that is XML in nature (e.g., has headers, tags, etc. surrounding the data values of interest).

```
<CLOTHES>                                    Example (3)
    <ITEM TYPE="Shirt">
        <STYLE ID="Polo">
            <SLEEVES TYPE="Full"/>
            <SIZE>Small</SIZE>
            <COLOR>Green</COLOR>
        </STYLE>
    </ITEM>
    <ITEM TYPE="Shirt">
        <STYLE ID="TurtleNeck">
            <SLEEVES TYPE="Short"/>
            <SIZE>Large</SIZE>
            <COLOR>Blue</COLOR>
        </STYLE>
    </ITEM>
</CLOTHES>
```

In example (3), there are two "ITEM" nodes under "CLOTHES". Hence, there are two processing units, each yielding a tuple. Example (4) illustrates two tuples that are produced from XML data in example (3) based on the map specification from example (2):

("Shirt","Polo","Full","Small",Green")

and ("Shirt","TurtleNeck","Short","Large","Blue")         Example (4)

After the map specification is generated, in block 302 of FIG. 3, parallel parsing/shredding of the input data is performed concurrently with serial loading of the shredded data into the database. The term "parsing" (e.g., in an XML context) may be described as a general term that indicates scanning an XML file. The term "shredding" may be thought of as indicating the procedures by which during a parse, the parsing program recognizes/identifies/locates data (e.g., by its path), in the XML file and forms tuples with such related data. Hence, shredding is a specific operation that is performed during a generic parse of a file. In particular, the row mappers module 220 works in a parallel configuration, with each parallel task (i.e., master or slave row mapper) invoked by the row mappers module 220 processing a portion of input data. However, even though parallel processing of the input data occurs, input data is serially loaded in the order in which the input data appears in the input file. With reference to XML data, because the parsing of XML data is very slow compared to the loading of relational data, the serialization of the tuple inflow does not form a bottleneck.

For the parallel processing, each row mapper 150, 152*a* . . . 152*n* may implement any serial shredding technique known in the art. For example, certain high performance shredding techniques typically rely on the event based SAX2 API of a standard XML parser. In certain implementations of the invention, each master or slave row mapper 150, 152*a* . . . 152*n* implements the same serial shredding technique. In certain other implementations of the invention, the master and slave row mappers 150, 152*a* . . . 152*n* may implement different serial shredding techniques.

A typical serial shredding process may be a single process or thread that would serially process all the input data (e.g., one XML input file after another) and send each row that is constructed to the database loader processes 146. Thus, in certain implementations of the invention, for a serial operation, one row mapper (e.g., 150 or one of 152*a* . . . 152*n*) would be present, and this row mapper would perform the actual serial shredding of all the input data (e.g., XML content) and sends each row to an appropriate location as the row appears down the load stream that goes to the database loader processes 146.

For instance, with XML data, the XML data is parsed and each XML element encountered is matched to its position in the XML path, starting from the location at which the first processing unit appears. The data value of each matched XML element is collected and tagged as data for the target column specified in the map specification. Once the end of the processing unit is reached, data collected from these matched elements is assembled into one or more specially formatted tuples for the target table. A missing data value would result in a SQL value of NULL for the corresponding column. The process is repeated for every processing unit encountered, resulting in multiple tuples for that XML content.

If there is only one instance of the row mapper (i.e. only row mapper '150' would exist, 152*a* . . . 152*n* will not), the row mapper would process the complete set of input data and produces relational tuples. However, the serial parse and shred of input data is time consuming. This could lead to a bottleneck in an otherwise smooth-flowing parallel database load process. Therefore, implementations of the invention may split the processing of input data (e.g., large XML data) into smaller, distinct manageable portions that may be handled by different row mappers 150, 152*a* . . . 152*n*, which would then produce corresponding resultant tuples independently.

In certain implementations of the invention, users may configure the number of row mappers to be invoked by the row mappers module 220. The number of row mappers may be based on an estimate of available resources (e.g., memory, Central Processing Units (CPUs)), the size of the input file to be loaded, and other external influences.

Figure 4A:
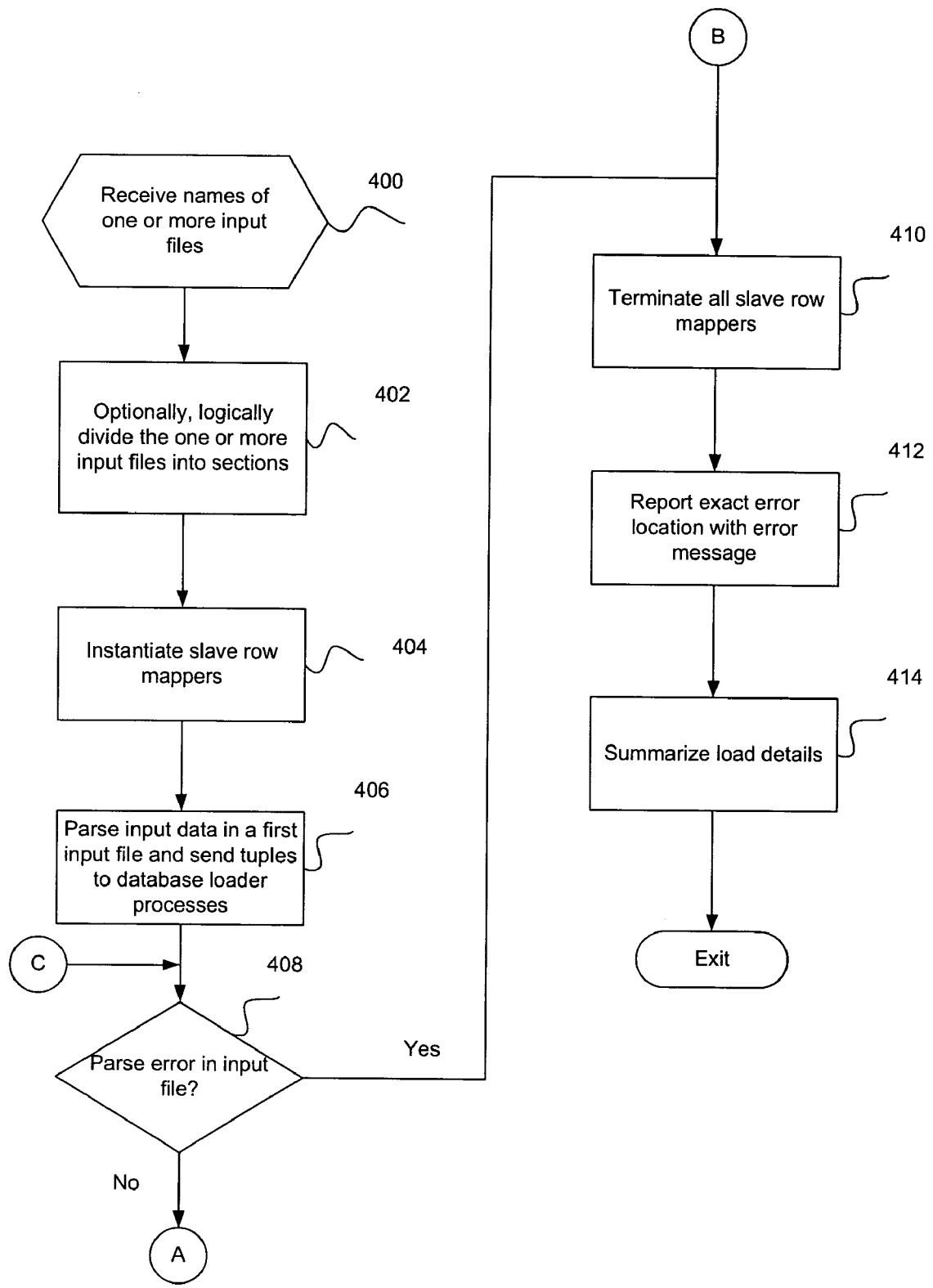
FIGS. 4A and 4B illustrate logic for performing parallel processing implemented in a master row mapper in accordance with certain implementations of the invention.
Figure 4B:
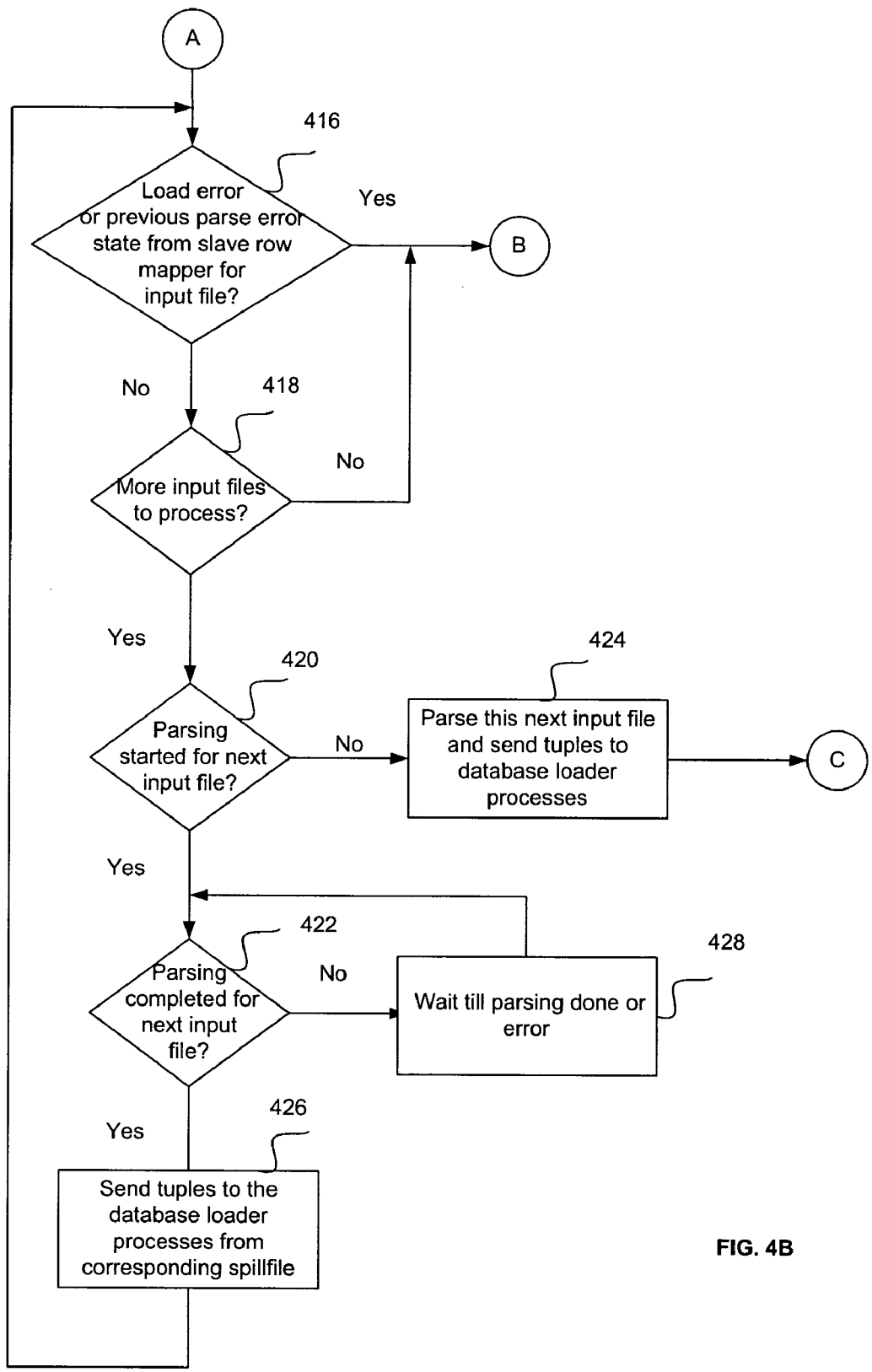

FIGS. 4A and 4B illustrate logic for performing parallel processing implemented in a master row mapper 150 in accordance with certain implementations of the invention. Control begins in block 400 with the master row mapper 150 receiving names of one or more input files (i.e., physical and/or logical input files). Note that initially, one row mapper (e.g., 150) is invoked, and, that row mapper determines whether to spawn one or more additional row mappers (e.g., 152*a* . . . 152*n*).

One technique to parallelize the processing of a large volume of input data is to pre-split the input data physically into multiple input files (e.g., where each input file is a valid XML document). The generators of the XML content may generate the XML data in multiple files, starting a new file when a particular file size is reached, but, this may not always be possible during XML generation. If there are multiple physical files, each row mapper 150, 152*a* . . . 152*n* processes one physical file at a time. For certain parallelism strategies using multiple physical files, a choice may be made to further subdivide each physical file into multiple logical sections, for example, when the files are large and multiple CPU resources are available.

As for parallelism strategies, even for a single input file, the input data may be divided into multiple portions, each of which may be processed by a separate row mapper 150, 152*a* . . . 152*n*. For example, one XML input file maybe logically divided into multiple sections of syntactically valid individual XML sections.

In block 402, the master row mapper 150 optionally logically divides one or more of the input files into two or more sections to form "logical files" (also referred as "sections"). That is, logically dividing an input file refers to dividing a physical file, leaving the physical file intact and without creating any new physical files after the division. In certain implementations, the number of sections may depend on the number of slave row mappers 152*a* . . . 152*n* that are to be invoked. For ease of reference, the term input file will be used to refer to either a physical file or a logical file.

That is, one technique to parallelize the processing of a large volume of input data is to section a single input file (e.g., input file 600 in FIG. 6) into multiple sections (i.e., logical files). For example, there may be situations in which the input data is provided in one physical file (rather than in multiple physical files). In such cases, the one physical file may be separated into multiple logical sections.

When a single input XML file is split into multiple sections, these individual sections are not considered valid XML files because only the first section would have an XML header, the last section would have a footer (i.e., the closing root tag), and the remaining sections would have neither. Implementations of the invention introduce the concept of logical XML files, which have valid XML content, with the body of the document coming from each section. These sections are made syntactically complete by: a) adding the footer to all sections, except the last; and, b) adding the XML header to all sections, except the first. In certain implementations of the invention, separate physical files are not created to correspond to each complete section. Instead, the header and footer would be fed to an XML parser (which may be part of each row mapper 150, 152*a* . . . 152*n*) before and after, respectively, the section is read from the original physical file. Therefore, mention of an input file may refer either to a physical file or to a logical file. Logical XML files (representing sections of an XML file) are syntactically complete and contain valid XML content.

In block 404, the master row mapper 150 instantiates zero or more slave row mappers 152*a* . . . 152*n*. In block 406, the master row mapper 150 parses input data in a first input file to generate tuples, and the master row mapper 150 forwards the tuples directly to the database loader processes 146. In block 408, the master row mapper 150 determines whether there was a parse error in the input file being processed. If so, processing continues to block 410, otherwise, processing continues to block 416.

In block 410, the master row mapper 150 terminates all slave row mappers 152*a* . . . 152*n*. In block 412, the master row mapper 150 reports the exact error location with an error message. In block 414, the master row mapper 150 summarizes the load details, and then exits.

In block 416, the master row mapper 150 determines whether there was a load error or a previous parse error state from a slave row mapper 152*a* . . . 152*n* for the input file.

If so, processing continues to block 410, otherwise, processing continues to block 418. In block 418, the master row mapper 150 determines whether there are more input files to process. If so, processing continues to block 420, otherwise, processing continues to block 410.

In block 420, since there are more input files to process, the master row mapper 150 determines whether parsing has started for a next input file. If so, processing continues to block 422, otherwise, processing continues to block 424. In block 424, the master row mapper 150 parses this next input file and sends tuples to the database loader processes 146.

In block 422, the master row mapper 150 determines whether parsing for the next input file is completed. If so, processing continues to block 426, otherwise, processing continues to block 428. In block 426, the master row mapper 150 sends tuples to the database loader from a spillfile corresponding to the next input file, and loops back to block 416. In block 428, the master row mapper 150 waits until parsing is done or there is an error and loops back to block 422.

Figure 5:
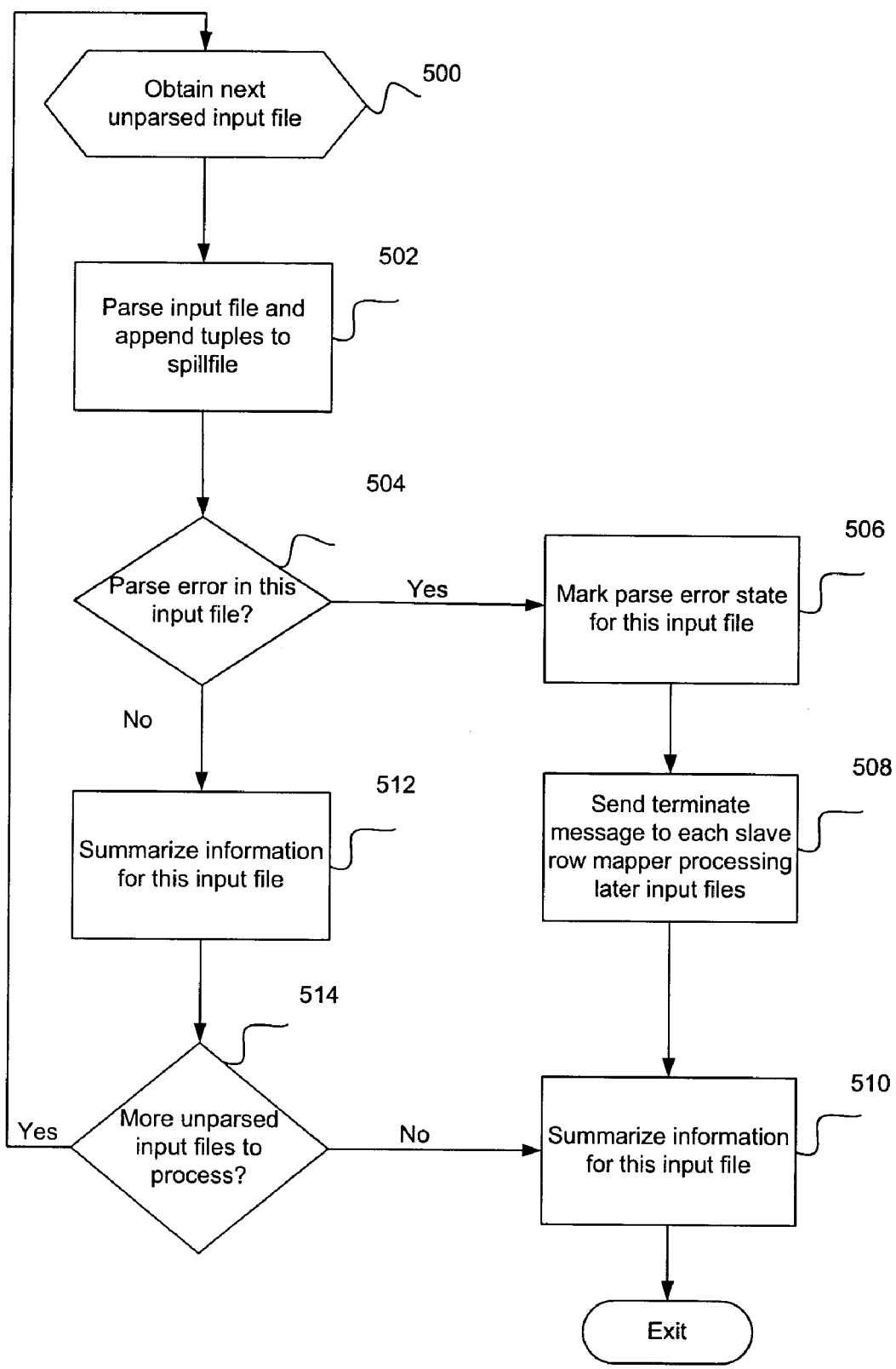
FIG. 5 illustrates logic for performing parallel processing implemented in each slave row mapper in accordance with certain implementations of the invention.

FIG. 5 illustrates logic for performing parallel processing implemented in each slave row mapper 152a . . . 152n in accordance with certain implementations of the invention. Control begins in block 500 with a slave row mapper 152a . . . 152n obtaining a next unparsed input file (i.e., a physical or logical file) each in a round robin fashion. In block 502, the slave row mapper 152a . . . 152n parses the input data in the input file to generate tuples and appends the tuples to a corresponding spillfile. In block 504, the slave row mapper 152a . . . 152n determines whether there was a parse error in this input file. If so, processing continues to block 506, otherwise, processing continues to block 512.

In block 506, the slave row mapper 152a . . . 152n marks a parse error state for the input file. In block 508, the slave row mapper 152a . . . 152n sends a terminate message to each slave row mapper processing later input files. In block 510, the slave row mapper 152a . . . 152n summarizes information for this input file and exits.

In block 514, the slave row mapper 152a . . . 152n determines whether there are any more unparsed input files to be processed. If so, processing continues to block 500, otherwise, processing continues to block 510.

Figure 6:
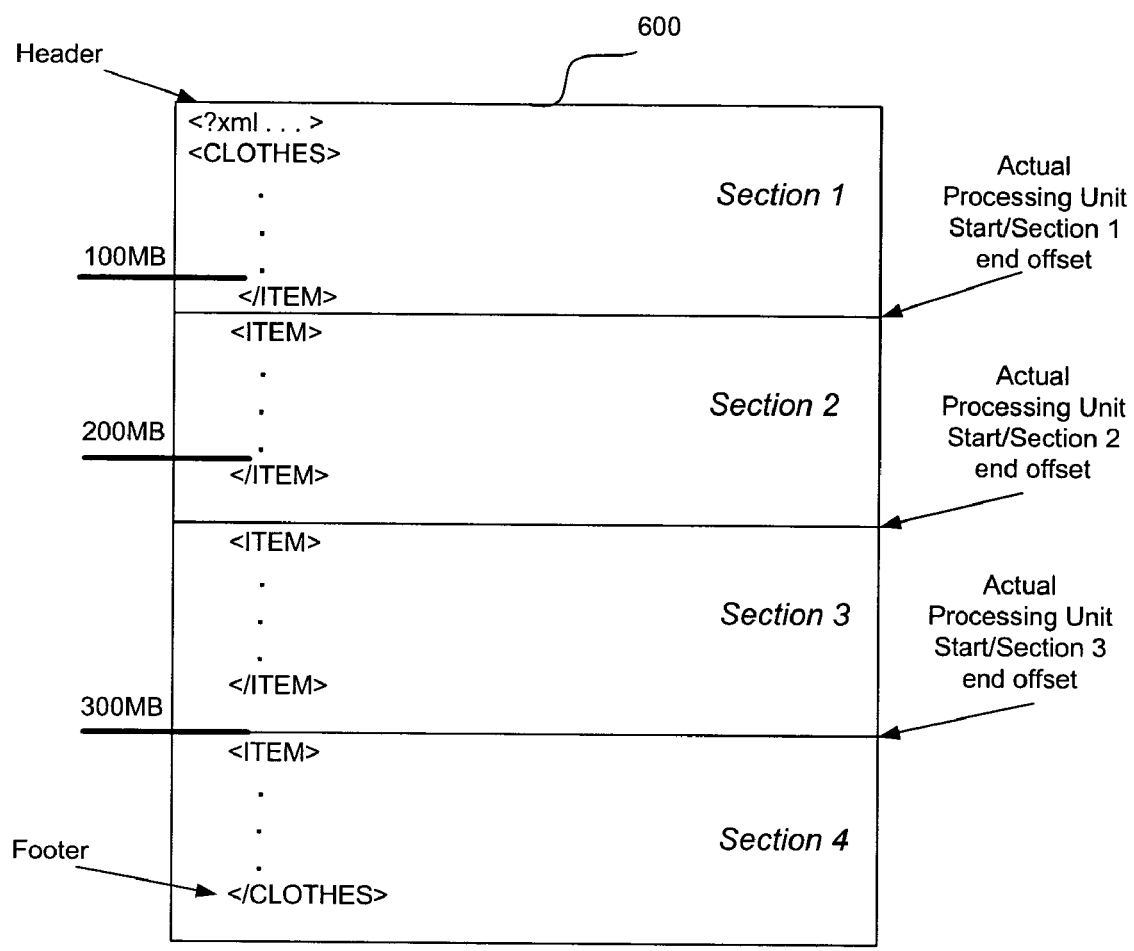
FIG. 6 illustrates an input file that is sectioned in accordance with certain implementations of the invention.

FIG. 6 illustrates an input file 600 that is sectioned in accordance with certain implementations of the invention. The input file 600 represents an XML file and includes a header and a footer. In particular, the master row mapper 150 identifies physical offsets into the input file and splits the file at these offsets. The number of row mappers 150, 152a . . . 152n available may be used to determine the offsets. For example, when the user specifies a maximum of four parallel row mappers 150, 152a . . . 152n for a 400 MB (megabyte) input file, the initial offsets may be calculated to be at the 100 MB, 200 MB and 300 MB points, as for input file 600.

As for XML data, XML is hierarchical and so any such split that is not based on the hierarchy may create sections that are incomplete and contain invalid XML structures. The row mappers 150, 152a . . . 152n are able to compose syntactically valid fragments of XML data from these sections. The notion of a "processing unit" is useful in identifying the start and end of data for tuples. The start of a processing unit maybe used to reposition the offsets in order to obtain syntactically valid XML fragments.

Figure 7:
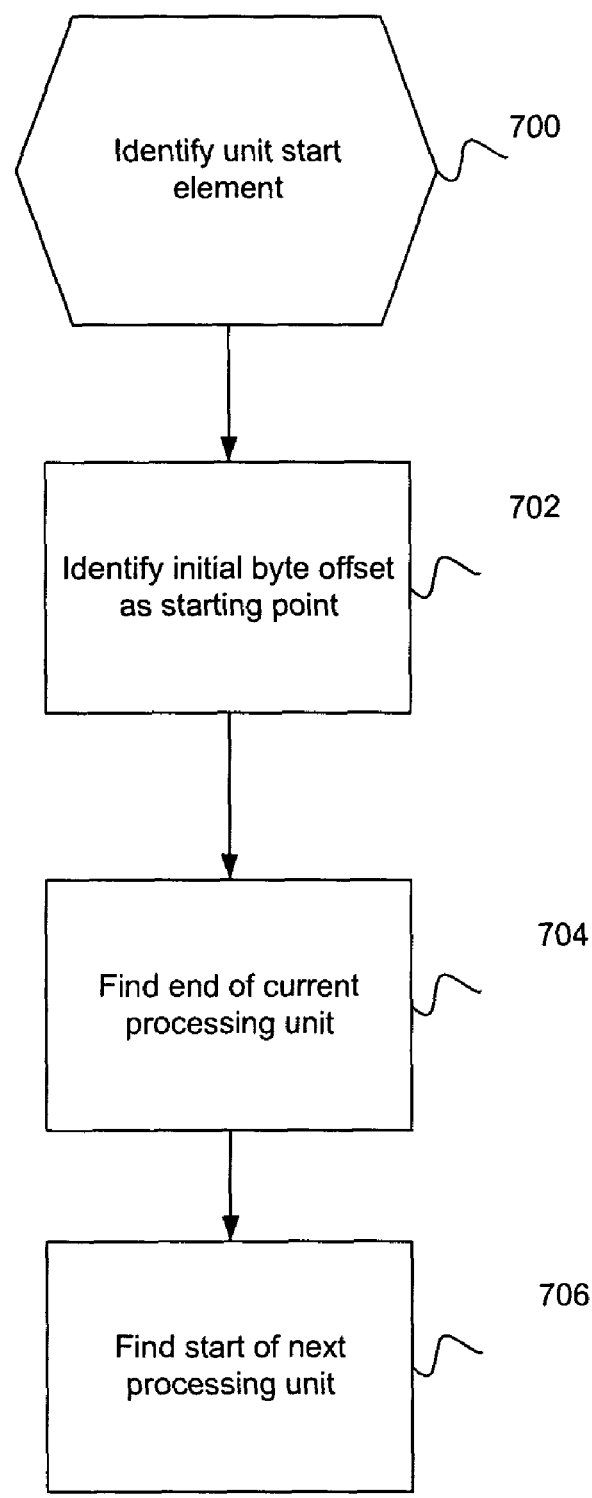
FIG. 7 illustrates logic for identifying the start and end of data for a section implemented in a row mapper in accordance with certain implementations of the invention.

FIG. 7 illustrates logic for identifying the start and end of data for a section implemented in a row mapper 150, 152a . . . 152n in accordance with certain implementations of the invention. In certain implementations of the invention, sectioning may be performed by either the master row mapper 150 or by individual slave row mappers 152a . . . 152n. In certain implementations, the master row mapper 150 decides on the initial offsets (e.g., the size/number of row mappers), and then when each slave row mapper 152a . . . 152n starts, the slave row mapper 152a . . . 152n repositions its current offset by finding the start of a processing unit.

Control begins in block 700 with identification of a "unit start element". While the processing unit is the largest leading common XML path fragment, the unit start element is the innermost common tag name in all the XML paths in the map specification. For the data in example (2), the unit start element is the tag "ITEM". Note that "CLOTHES", which is a root tag, is the outer-most common tag. In block 702, an initial byte offset that was previously calculated based on the number of row mappers 150, 152a . . . 152n to be invoked is identified. The initial byte offset is used as a starting point. For example, the row mapper 150, 152a . . . 152n may start at 100 MB.

In block 704, the end of the current processing unit is found. To find the end of the current processing unit, the row mapper 150, 152a . . . 152n scans for the close tag of the unit start element and, for special cases, scans for an XML path fragment. The row mapper 150, 152a . . . 152n starts forward scanning the XML content till either the close tag of the unit start element is found or till the end of the input file is reached. For the data in example (2), the row mapper 150, 152a . . . 152n scans the document for the string "</ITEM>".

There are some special cases that are handled. When the unit start element appears twice in the XML content, under different hierarchies, the row mapper 150, 152a . . . 152n would need to scan for XML path fragments, in order to avoid matching a string at the wrong level in the hierarchy, and thus using a wrong start point. For example, if the processing unit structure had the unit start element "ITEM" twice, as in /ORDER/ITEMS/CLOTHES/ITEMS, then scanning for the close tag of the unit start element may match the close tag of the ITEMS tag under the CLOTHES node instead of the element ITEMS under the ORDERS node. In such cases, the tag after the unit start element is also included in the scan. For example, CLOTHES is also scanned for (i.e., instead of just the ITEM tag, the XML path fragment /ITEMS/CLOTHES is scanned for) If even this XML path fragment is duplicated, then the next tag is also included in the scan. This process of including each succeeding element from the processing unit structure may continue until a distinct XML path fragment is found. For this special case, the scanning is modified to include this XML path fragment.

In particular, the row mapper 150, 152a . . . 152n scans for an XML path fragment by starting forward scanning, while maintaining a stack of each open and close tags found, until either the close tag string of the unit start element is found or till the end of file is reached. If a string matching the unit start element is found, the row mapper 150, 152a . . . 152n checks to see whether the stack contains, in order, the close tags for each of the elements from the XML path fragment being scanned. For the /ITEMS/CLOTHES XML path fragment, "</ITEM>" would be searched for and a check made to see whether the stack contained the "</CLOTHES>" tag.

In block 706, the row mapper 150, 152a . . . 152n finds the start of the next processing unit. Once the end of one processing unit has been found, the row mapper 150, 152a . . . 152n scans forward from that point, until the next start tag of the unit start element is found. The byte at the start of this tag is the corrected offset mark for a section. For example, the actual processing unit starts for section 2, section 3, and section 4 of input file 600 are the appropriate offsets at which slave row mappers 152a . . . 152n are to start processing data. Note that the actual processing unit starts are not necessarily the same as the initially calculated offsets of 100 MB, 200 MB, and 300 MB.

There may be some situations in which the sectioning technique implemented by the master row mapper 150 may not create sections that are valid (e.g., sections with valid XML content). This may happen, for example, when there are comments and CDATA sections that obscure processing unit start and end points. Also, users may list incorrect and/or incomplete XML paths corresponding to the XML input in the map specification. An incorrect or incomplete XML path may also cause a sectioning error or some kind of recursion in the input XML data.

Since a "serial load" is performed with parallel parsing, each row mapper 150, 152a . . . 152n can identify sectioning errors easily, simply because the end offset of a section processed by one row mapper 150, 152a . . . 152n and the start offset processed by another row mapper 150, 152a . . . 152n would overlap. In such erroneous sectioning cases, the row mapper 150, 152a . . . 152n processing the content after the offset would have encountered a processing error (e.g., an XML syntax error). The row mapper 150, 152a . . . 152n processing the content before the offset would need to cross the offset point to complete its processing of the last processing unit in that section. At this point the overlap of sections is discovered. For recovery of this sectioning error, the row mapper 150, 152a . . . 152n from the previous section would continue processing its section, as well as, the next section.

Figure 8A:
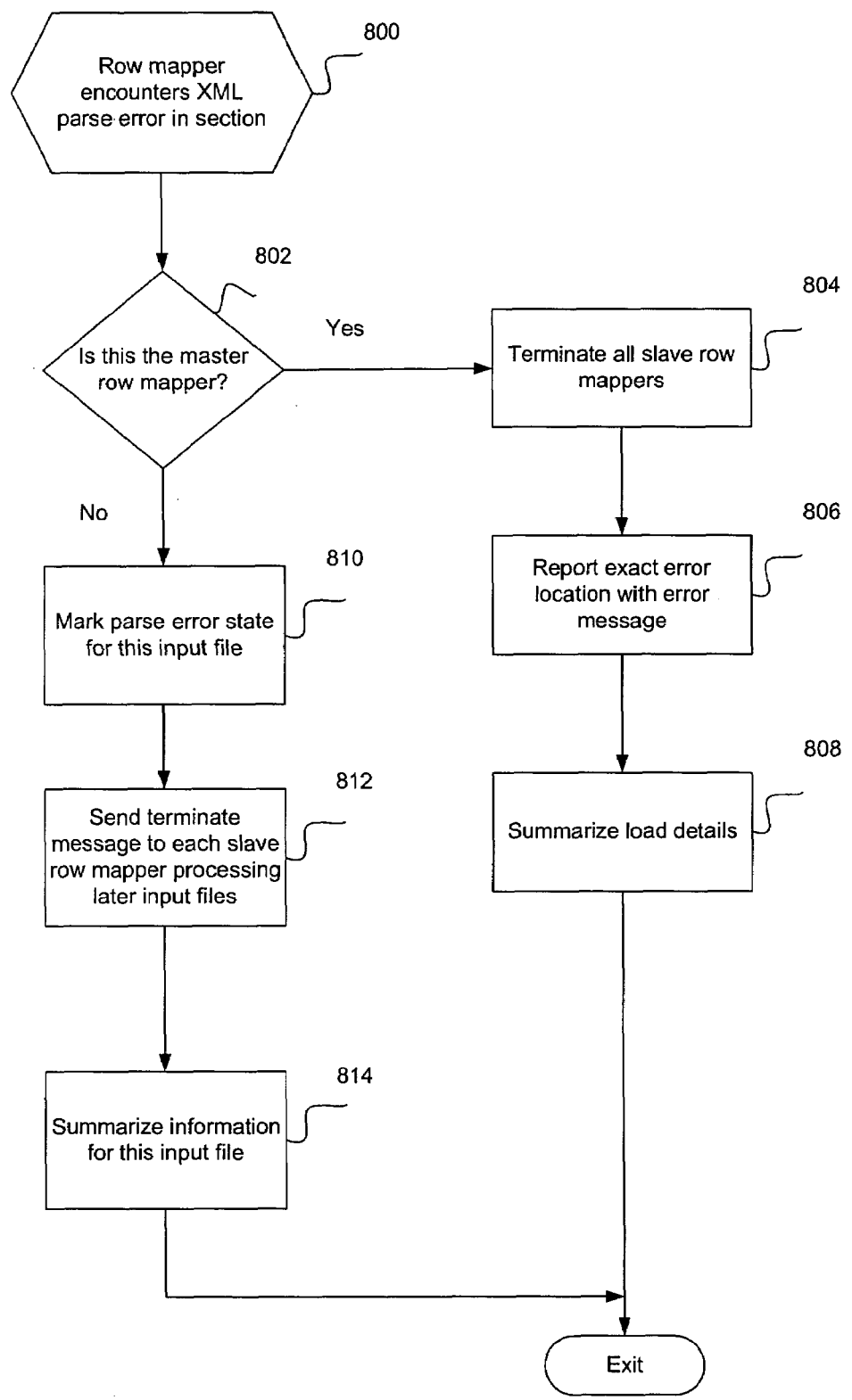
FIG. 8A illustrates logic for parse error reporting implemented in each row mapper in accordance with certain implementations of the invention.

FIG. 8A illustrates logic for parse error reporting implemented in each row mapper 150, 152a . . . 152n in accordance with certain implementations of the invention. Control begins at block 800 with a row mapper 150, 152a . . . 152n encountering an XML parse error in a section (i.e., logical file). In block 802, if this row mapper is a master row mapper 150, processing continues to block 804, otherwise, processing continues to block 810.

In block 804, the master row mapper 150 terminates all slave row mappers 152a . . . 152n. In block 806, the master row mapper 150 reports the exact error location with an error message. In block 808, the master row mapper 150 summarizes the load details, and then exits.

In block 810, the slave row mapper 152a . . . 152n marks a parse error state for the input file. In block 812, the slave row mapper 152a . . . 152n sends a terminate message to each slave row mapper processing later input files. In block 814, the slave row mapper 152a . . . 152n summarizes information for this input file and exits.

Figure 8B:
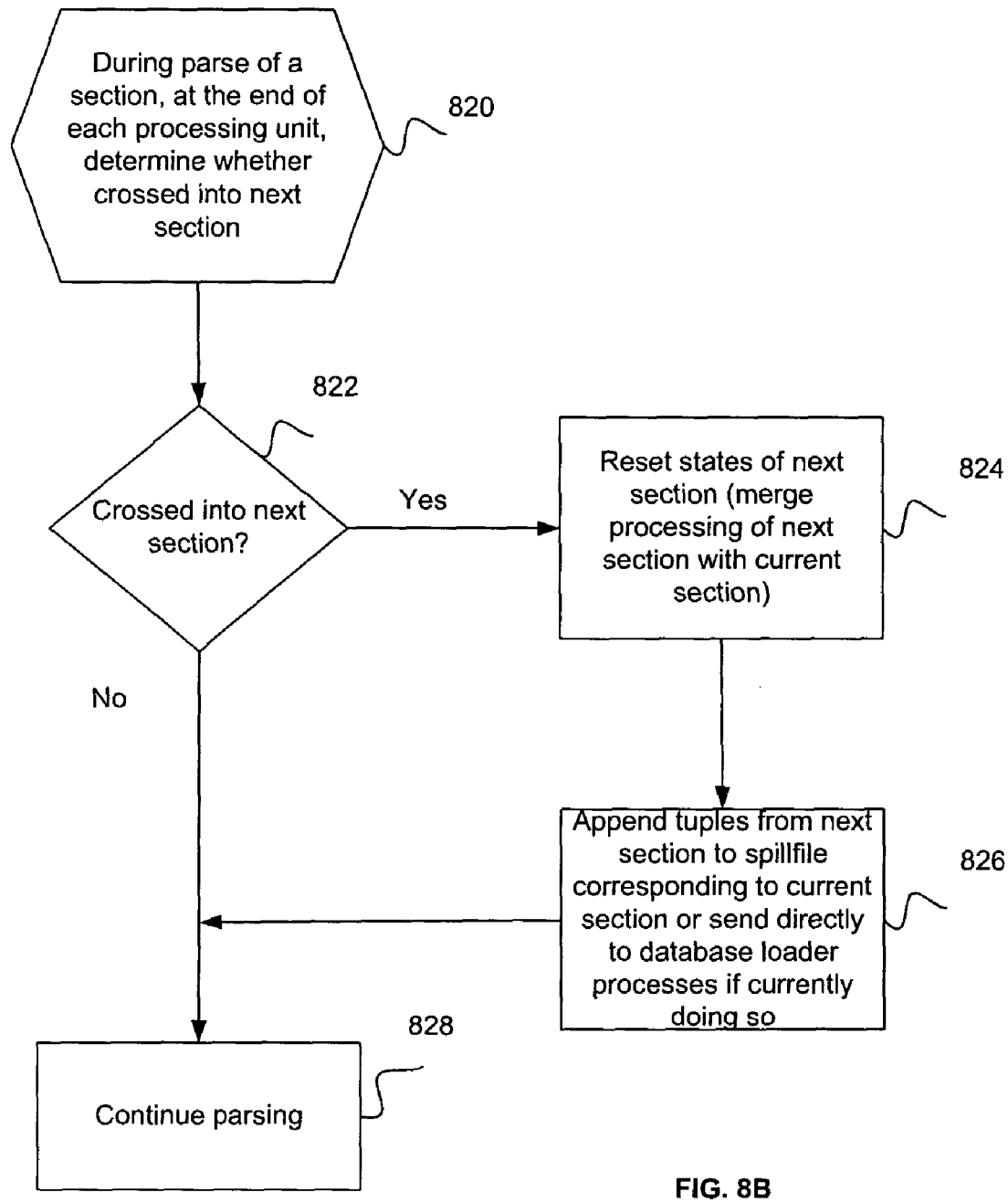
FIG. 8B illustrates logic for identifying sectioning errors and correcting the sectioning errors implemented in each row mapper in accordance with certain implementations of the invention.

FIG. 8B illustrates logic for identifying sectioning errors and correcting the sectioning errors implemented in each row mapper 150, 152a . . . 152n in accordance with certain implementations of the invention. Control begins at block 820 with a row mapper 150, 152a . . . 152n determining, during parsing of a section (i.e., a logical file) and at the end of each processing unit, whether the row mapper 150, 152a . . . 152n has crossed into the next section. If so, processing continues to block 824, otherwise, processing continues to block 828. In block 824, the row mapper 150, 152a . . . 152n has encountered a sectioning error for the next file, while processing a current file. The row mapper 150, 152a . . . 152n resets a state of the next section to indicate that there was a sectioning error and merges processing of the next section with processing of the current section. In certain implementations, such a sectioning error may be silently corrected by the row mapper 150, 152a . . . 152n, without the sectioning error being reported. In block 826, the row mapper 150, 152a . . . 152n appends tuples from the next section to the spillfile corresponding to the current section or sends the tuples directly to the database loader processes 146 if the row mapper 150, 152a . . . 152n is currently doing so (e.g., if the row mapper is a master row mapper 150). In block 828, the row mapper 150, 152a . . . 152n continues parsing.

For example, if row mapper A was processing Section 2 and storing tuples in Spillfile X and row mapper A determined that there was a sectioning error (i.e., a cross into the next section during parsing) requiring row mapper A to process Section 3, then, row mapper A would append tuples generated from data in Section 3 into Spillfile X. In block 806, the row mapper would terminate processing of its section and delete its corresponding spillfile. For example, if row mapper B was processing Section 3 and storing tuples in Spillfile Y and row mapper A determined that there was a sectioning error, row mapper A would cause row mapper B to terminate processing (if row mapper B were still processing Section 3) and delete the corresponding Spillfile Y.

For parallel row mapper 152a . . . 152n operation, multiple copies of the row mapper are instantiated, with the limit to the number of copies being set by a user's configuration. The row mappers 152a . . . 152n process input files in a list of input files (e.g., physical or logical files) in a round robin fashion. That is, each row mapper 152a . . . 152n starts by obtaining one input file, and then after completion of its processing, the row mapper 152a . . . 152n obtains another unprocessed input file from the list of input files. This process continues until all input files have been processed. The maximum number of row mappers 152a . . . 152n spawned would have an upper bound equal to the total number of input files ( i.e., if there are five distinct XML sections, then a maximum of five row mappers 152a . . . 152n are spawned).

In certain implementations of the invention, parallel parsing and serial loading of data is used to ensure that data is loaded in the order in which the data appeared in the input file. For example, each individual row mapper 150, 152a . . . 152n could directly send tuples, as and when they arrive, down the load stream to the database loader processes 144. But, this technique may not load data in the order in which the data appears, which is important for certain operations (e.g., for UPSERT operations and for correct duplicate detection).

Therefore, the row mappers 150, 152a . . . 152n perform shredding in parallel, but the tuples are loaded into the database 180 in sequence. To accomplish this, the master row mapper 150 that processes the first input file would process data in the input file to generate tuples and send down the load stream the tuples as the data from which the tuples were generated appear in the first input file. The slave row mappers 152a . . . 152n send tuples to different spillfiles instead. These spillfiles are temporary storage spaces, which may be physical files on disk or shared memory segments, accessible to the different row mappers 150, 152a . . . 152n. After the processing of the first file is completed and its data sent down the load stream, the master row mapper 150 sends the next set of data from the spillfile corresponding to the second input file, followed by the third, and so on.

A spillfile may be deleted as soon as all the flat tuples from that spillfile are loaded or at the end of a complete successful load of all of the input data. This may be the basis of a policy decision (e.g., to recover file system space as soon as possible or to retain the spillfiles in case of error or for some investigations). Any statistical information that pertains to the corresponding input files (e.g., the number of lines (or characters or bytes) in that input file) may also be saved, once each input file is processed. The statistical information may be useful for restartability of the loading process if an error interrupts the loading of data.

Implementations of the invention provide error handling and load restartability. Proper error handling is useful because database loading processes 144 are generally expensive and resource intensive processes. Database loading processes 144 are typically restarted at the point at which errors occurred, rather than restarting the loading from the beginning. Also, restarting from scratch may be difficult because the target database may have to be rolled back to a prior load state, which may be impossible in certain transaction oriented situations where loaded rows are already committed. Some database loaders, (e.g., the Red Brick® Table Management Utility (TMU) for the IBM® Red Brick® Warehouse) provide users with the capability to pinpoint exactly at which point the error occurred. The database loading can then recommence, after the problem has been fixed, right from the place where it was stopped.

In the XML load situation, this would entail reporting exactly where (apart from what type of error) the error occurred. For example, for parsing of a single XML file, the XML parser is able to provide an exact file offset at which the error occurred. However, when one or more input files are sectioned into many pieces, the row mappers 150, 152a . . . 152n may report the error locations with the assumption that the section start is the start of the file. With logical XML files, to report the exact physical file error location in a section, a simple summation of the total number of lines per section in that particular file, prior to that location, may be done. With order enforced database loads, since tuples are loaded in the sequence in which the tuple data occurs in the input files, error handling is performed by terminating any processing (i.e., terminating processing) on later content, once the first error occurs. Once the first error occurs, the row mappers 150, 152a . . . 152n are able to identify the location of the error, and the load process may be restarted later at this point.

In certain implementations of the invention, to restart the load, users may specify to "skip" a fixed number of tuples that were loaded during the last load session. In case of errors in the load phase (e.g., erroneous data or with data that fails to match a load session's "filter" acceptance condition or application relevant accept/reject criteria), the database loading process 144 may choose to discard rows that cause errors. These rows may be discarded in flat format, instead of in an original (e.g., XML) format. Since, if the user decides to later reload such rows, after any error corrections, expensive re-parsing of the input data can be avoided. Some tuples may be discarded by some application criteria, or some sort of loading error. In these cases, it may be useful to discard such tuples in their flat format as opposed to their original XML format. When users, after fixing any application/system problems, decide to restart their loads, they can re-use the same commands with the XML map specifications, except that the program would instead use the post-parsed data that was previously discarded, rather than parse the XML files again.

Figure 9:
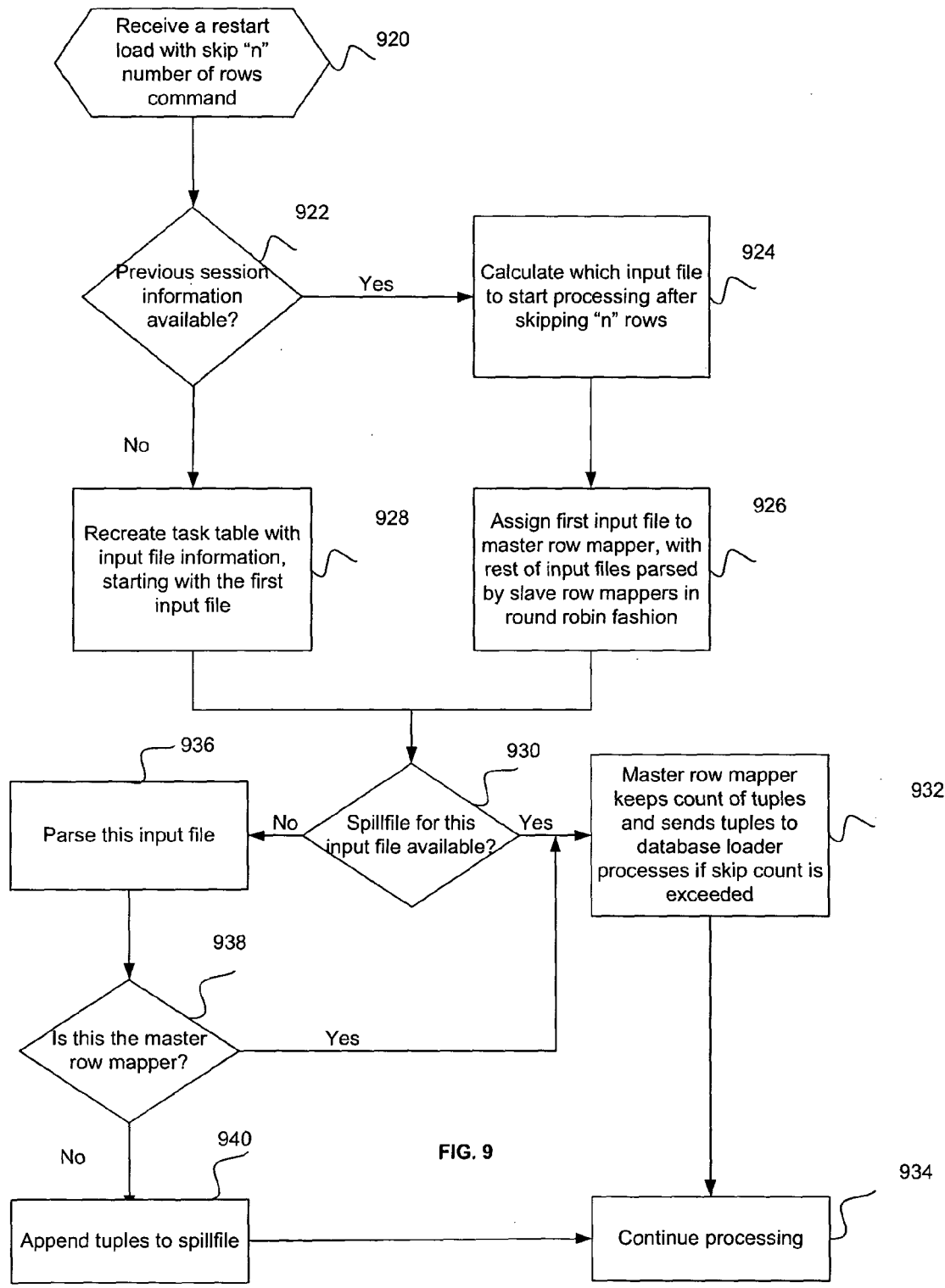
FIG. 9 illustrates logic for restarting from a previous loading error implemented in row mappers in accordance with certain implementations of the invention.

FIG. 9 illustrates logic for restarting from a previous loading error implemented in row mappers 150, 152a . . . 152n in accordance with certain implementations of the invention. When users specify that "n" number of rows are to be skipped, the load processing proceeds as before, and the master row mapper 150 keeps count and sends tuples down the load stream after the count crosses the skip-count. If the spillfiles for the input files, prior to the restart location, had been retained, then there would not be a need to perform a re-parse of the input data that had already been loaded. If certain information (e.g., number of lines processed etc.), had been stored, the information may also be used for skipping the processing of some of the input files.

In FIG. 9, control begins at block 920 with the master row mapper 150 receiving a restart load with skip "n" number of rows command. In block 922, the master row mapper 150 determines whether information is available from a previous session. If so, processing continues to block 924, otherwise, processing continues to block 928. In block 924, the master row mapper 150 calculates which input file to start processing after skipping "n" rows. In block 926, the master row mapper 150 assigns the first input file to itself, with the rest of the input files to be parsed by slave row mappers 152a . . . 152n in a round robin fashion. In block 928, the master row mapper 150 recreates a task table storing information on input files with input file information, starting with the first input file.

In block 930, the row mapper 150, 152a . . . 152n determines whether a spillfile for this input file is available. If so, processing continues to block 932, otherwise, processing continues to block 936. In block 932, the master row mapper 150 keeps count of tuples and sends the tuples to the database loader processes 146 if the skip count is exceeded.

In block 936, the row mapper 150, 152a . . . 152n parses the input file. In block 938, if the row mapper is a master row mapper 150, processing continues to block 932, otherwise, processing continues to block 940. In block 940, the slave row mapper 152a . . . 152n appends tuples to the spillfile. In block 934, the row mapper 150, 152a . . . 152n continues processing.

FIG. 10 illustrates a task table 1000 in accordance with certain implementations of the invention. This task table 1000 is used in certain implementations of the invention for a round robin XML file/spillfile parallel processing. The task table 1000 is a table that is used to keep track of the list of input files and their current processing status. This table is modifiable in an exclusive manner, but may be accessed without restriction for read only operations. For example, to update the status of processing of an input file, an exclusive lock is obtained by a row mapper 150, 152a . . . 152n, but for checking on the current status of the input file, the row mapper 150, 152a . . . 152n does not need to obtain a lock.

In certain implementations of the invention, the task table 1000 has the following columns: input file number identifying the input file, input file location indicating where the input file is stored, offset at which to start processing, spillfile location for the corresponding input file, state, rows processed, lines/characters or bytes processed, header text, and footer text.

One of the row mappers is designated the master row mapper (e.g., 150). The master row mapper 150 starts processing the first input file and acts as the only row mapper 150, 152a . . . 150n that sends rows down the load stream. For physical files that need to be sectioned into logical files, the master row mapper 150 calculates the initial offsets and the required headers and footers for the subsequent sections. The master row mapper 150 also creates and populates the task table 1000 in, for example, shared memory, and creates semaphores or locks needed for exclusive access to the task table 1000. The master row mapper 150 also spawns additional threads or processes for the slave row mappers 152a . . . 152n.

In particular, the master row mapper 150 parses the map specification and instantiates data structures for the shredding technique. The master row mapper 150 also obtains the list of input files and the maximum number of row mappers to be created. The master row mapper 150 creates the task table 1000 with each details of each input file details. If logical files are sectioned out of physical ones, the preliminary offsets and header and footer entries are placed in the task table 1000 by the master row mapper 150. Each input file has an entry in the table with an initial state value of "TO_BE_PARSED". The master row mapper 150 selects the first input file from the task table 1000, and mark the state of the selected input file as "BEING_PARSED_TO_STREAM". The master row mapper 150 spins off the slave row mappers 152$a$ . . . 152$n$.

Each slave row mapper 152$a$ . . . 152$n$ receives copies of the map data structures and an independent parser (e.g., an XML Parser instance). Each slave row mapper 152$a$ . . . 152$n$ locks the task table 1000 one at a time, and retrieves the next input file on the list of input files that has a "TO_BE_PARSED" state. Each slave row mapper 152$a$ . . . 152$n$ sets the status of the retrieved input file to "BEING_PARSED_TO_SPILLFILE".

If there is an offset specified, then the input file is a logical file. For sections other than the first section, the header text is sent from the task table 1000 to the parser, prior to data being read from the physical file. The input file is read starting at the offset point, and the offset is reset to the start of the next processing unit, as described above with reference to FIGS. 6 and 7. The task table 1000 is then locked, and the offset is updated with the corrected value for that section. After the section has been processed, the footer text is presented to the parser, to complete the illusion of a valid XML file.

If the state of an input file is "BEING_PARSED_TO_STREAM", then the master row mapper 150 parses the input file and builds tuples according to the map specification. Every time a tuple is encountered, the tuple is sent directly down the load stream. However, if the state of the input file is "BEING_PARSED_TO_SPILLFILE", then instead of being sent down the load stream, the tuples are added to the spillfile specified for the input file. At this point, the slave row mapper 152$a$ . . . 152$n$ processing the input file would lock the physical spillfile, as a sign that processing is currently under way. When it comes time to read the tuples from this spillfile and send the data down the load stream, the master row mapper 150 waits for the lock on the spillfile to be released.

On encountering an error during the parse process, the state for that file is updated to "PARSE_ERROR" and the rows processed and lines/characters summary information is updated. For a complete physical file (i.e. not just a section), the error message refers to the exact physical file location in either lines/characters or byte offsets, and hence can be reported right away.

For a logical file, error reporting is delayed until the remaining row mappers 152$a$ . . . 152$n$ finish their parsing, and the master row mapper 150 calculates an aggregated physical location. The row mapper 150, 152$a$ . . . 152$n$ encountering the error then locks the task table 1000 and marks every the state of each subsequent input file as being "ERROR_TERMINATE", which informs every other row mapper 150, 152$a$ . . . 152$n$ that processing is to be terminated. The row mapper 150, 152$a$ . . . 152$n$ encountering the error then exits, and each of the row mappers 150, 152$a$ . . . 152$n$ processing later files, would exit in turn, upon noticing the "ERROR_TERMINATE" state.

When the processing for an input file in the state "BEING_PARSED_TO_SPILLFILE" is successfully completed, the current row mapper 152$a$ . . . 152$n$ would update the current file's state to "PARSE_SUCCESS" and release the lock on the spillfile. For an input file that is in state "BEING_PARSED_TO_STREAM" (i.e., one that is being processed by the master row mapper 150), a success would mean that both phases (parse and load) were completed successfully, and the state is set to LOAD_SUCCESS. Summary entries for the input file are then updated in the task table 1000.

After every processing unit has been processed, the row mapper 150, 152$a$ . . . 152$n$ checks whether there had been a sectioning error (offset mis-calculation) with the next section, and if so, continues processing (i.e., reprocessing) the next section.

The master row mapper 150, on successful parsing and loading of the first input file, selects the next input file that is on the list of input files. If the selected input file has not been selected by a slave row mapper 152$a$ . . . 152$n$ to be parsed, the master row mapper 150 sets the state of the selected input file to "BEING_PARSED_TO_STREAM" and commences processing the input file. If the status of the selected input file is "PARSE_SUCCESS", the master row mapper 150 selects tuples for that input file from the corresponding spillfile and sends the tuples down the load stream. Once a spillfile has been exhausted, it may be deleted. The state of the input file is then set to LOAD_SUCCESS.

If the master row mapper 150 finds that the state of the next input file is BEING_PARSED_TO_SPILLFILE", the master row mapper 150 waits to acquire the spillfile lock. Once the master row mapper 150 acquires this lock, the master row mapper 150 checks the status of the input file in the task table 1000. If the status is still "BEING_PARSED_TO_SPILLFILE", the master row mapper 150 would recognize that the row mapper 152$a$ . . . 152$n$ that was parsing that input file exited abnormally. In such a situation, the master row mapper 150 may start parsing the input file and send the tuples directly down the load stream and the state of the input file would be set to "BEING_PARSED_TO_STREAM".

If, after acquiring the spillfile lock, the master row mapper 150 finds that the state of the input file is a "PARSE_ERROR", the master row mapper 150 loads the tuples from the spillfile (which would be the tuples generated from data before the error location), updates the "number of rows loaded" summary entry, and sets the status of the input file to "LOAD_ERROR". The master row mapper 150 then terminates processing at that point.

For slave row mappers 152$a$ . . . 152$n$, processing of input files is repeated until there are no more input files in the "TO_BE_PARSED" state. For the master row mapper 150, processing of input files is repeated until there are no more input files in either the "TO_BE_PARSED" state, or in the "PARSE_SUCCESS" or "PARSE_ERROR" states.

The master row mapper 150 produces a report on the summaries, including any errors that have occurred, if not reported already, along with the physical error locations, (e.g., line numbers if possible).

Thus, implementations of the invention provide parallel processing and order-sensitive loading of high-volume data into a relational table. Certain implementations of the invention provide parallel processing of XML content for conversion of the XML content into a relational format. The implementations of the invention maintain the order of data appearance in the XML structure. Also, a database loader is extended to accept XML data as its input. Moreover, implementations of the invention provide a solution for error handling and load restartability and load the XML data without the generation or evaluation of SQL commands.

ADDITIONAL IMPLEMENTATION DETAILS

The described techniques for processing input data (e.g., input XML data) may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 3, 4A, 4B, 5, 7, 8A, 8B, and 9 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 3, 4A, 4B, 5, 7, 8A, 8B, and 9 may be implemented in software, hardware, programmable and non-programmable gate array logic or in some combination of hardware, software, or gate array logic.

Figure 11:
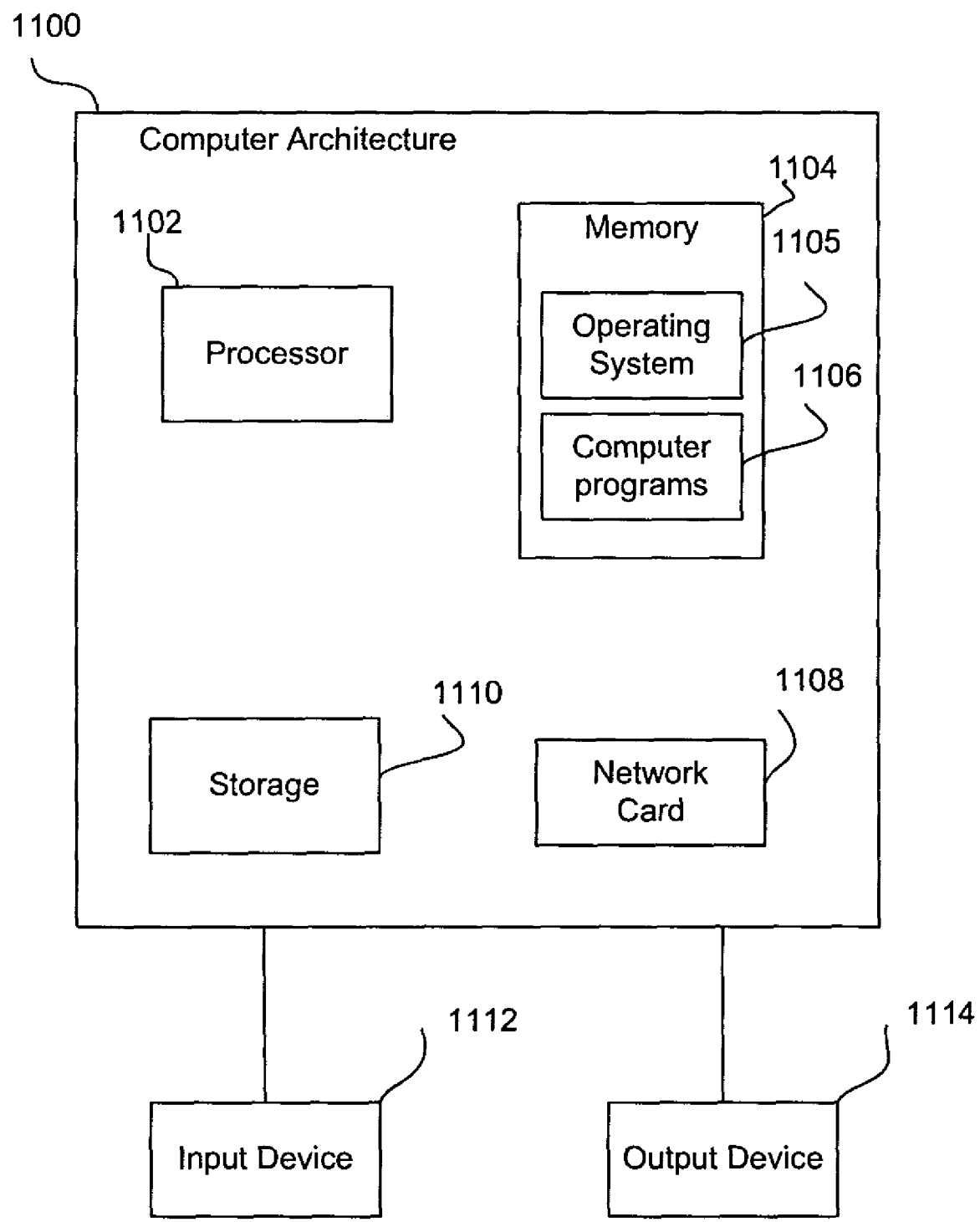
FIG. 11 illustrates an architecture of a computer system that may be used in accordance with certain implementations of the invention.

FIG. 11 illustrates an architecture of a computer system that may be used in accordance with certain implementations of the invention. For example, computer 100 and/or server computer 120 may implement computer architecture 1100. The computer architecture 1100 may implement a processor 1102 (e.g., a microprocessor), a memory 1104 (e.g., a volatile memory device), and storage 1110 (e.g., a non-volatile storage area, such as magnetic disk drives, optical disk drives, a tape drive, etc.). An operating system 1105 may execute in memory 1104. The storage 1110 may comprise an internal storage device or an attached or network accessible storage. Computer programs 1106 may be loaded from storage 1110 into the memory 1104 and executed by the processor 1102 in a manner known in the art.

The architecture further includes a network card 1108 to enable communication with a network. An input device 1112 is used to provide user input to the processor 1102, and may include a keyboard, mouse, pen-stylus, microphone, touch sensitive display screen, or any other activation or input mechanism known in the art. An output device 1114 is capable of rendering information from the processor 1102, or other component, such as a display monitor, printer, storage, etc. The computer architecture 1100 of the computer systems may include fewer components than illustrated, additional components not illustrated herein, or some combination of the components illustrated and additional components.

The computer architecture 1100 may comprise any computing device known in the art, such as a mainframe, server, personal computer, workstation, laptop, handheld computer, telephony device, network appliance, virtualization device, storage controller, etc. Any processor 1102 and operating system 1105 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for loading input data in one or more hierarchical format input files into a data store, comprising:
   under control of a master row mapper,
      invoking one or more slave row mappers, wherein the slave row mappers perform processing in parallel with the master row mapper and with each other, wherein the parallel processing includes parallel parsing and construction of tuples using a map specification that maps input data in the one or more input files to columns of the tuples;
      processing data in a first input file to output tuples; and
      forwarding the tuples and tuples in one or more spillfiles to one or more database loader processes;
   under control of each of the slave row mappers,
      processing data in a separate input file to output tuples; and
      storing the tuples in a corresponding spillfile; and
   under control of the one or more database loader processes, serially loading the tuples into the data store.

2. The method of claim 1, further comprising:
   under control of the master row mapper,
      determining that there has been an error in processing the data in at least one input file; and
      terminating the slave row mappers.

3. The method of claim 1, further comprising:
   under control of the master row mapper,
      determining that there has been an error in loading the processed data in at least one input file; and
      terminating the slave row mappers.

4. The method of claim 1, further comprising:
   under control of at least one of the slave row mappers,
      determining that there has been an error in processing the data in at least one input file; and terminating each of the other slave row mappers processing a separate input file whose order follows the separate input file being processed by the slave row mapper that determined that there has been an error.

5. The method of claim 1, wherein each of the one or more input files is a section, further comprising:
under control of the master row mapper and each of the slave row mappers, during processing of a current section, at the end of a processing unit,
determining that processing has crossed into a next section; and
continuing to process data in the next section.

6. The method of claim 1, further comprising:
when restarting loading of the processed data, skipping a specified number of rows in at least one of the input files.

7. A computer system having at least one program for loading input data in one or more hierarchical format input files into a data store, comprising:
under control of a master row mapper,
invoking one or more slave row mappers, wherein the slave row mappers perform processing in parallel with the master row mapper and with each other, wherein the parallel processing includes parallel parsing and construction of tuples using a map specification that maps input data in the one or more input files to columns of the tuples;
processing data in a first input file to output tuples; and
forwarding the tuples and tuples in one or more spill-files to one or more database loader processes;
under control of each of the slave row mappers,
processing data in a separate input file to output tuples; and
storing the tuples in a corresponding spillfile; and
under control of the one or more database loader processes, serially loading the tuples into the data store.

8. An article of manufacture comprising one of hardware logic implementing logic and a computer readable medium including a program for loading input data in one or more hierarchical format input files into a data store, wherein the logic or program causes operations to be performed, the operations comprising:
under control of a master row mapper,
invoking one or more slave row mappers, wherein the slave row mappers perform processing in parallel with the master row mapper and with each other, wherein the parallel processing includes parallel parsing and construction of tuples using a map specification that maps input data in the one or more input files to columns of the tuples;
processing data in a first input file to output tuples; and
forwarding the tuples and tuples in one or more spill-files to one or more database loader processes;
under control of each of the slave row mappers,
processing data in a separate input file to output tuples; and
storing the tuples in a corresponding spillfile; and
under control of the one or more database loader processes, serially loading the tuples into the data store.

9. The article of manufacture of claim 8, wherein the operations further comprise:
under control of the master row mapper,
determining that there has been an error in processing the data in at least one input file; and
terminating the slave row mappers.

10. The article of manufacture of claim 8, wherein the operations further comprise:
under control of the master row mapper,
determining that there has been an error in loading the processed data in at least one input file; and
terminating the slave row mappers.

11. The article of manufacture of claim 8, wherein the operations further comprise:
under control of at least one of the slave row mappers,
determining that there has been an error in processing the data in at least one input file; and
terminating each of the other slave row mappers processing a separate input file whose order follows the separate input file being processed by the slave row mapper that determined that there has been an error.

12. The article of manufacture of claim 8, wherein each of the one or more input files is a section and wherein the operations further comprise:
under control of the master row mapper and each of the slave row mappers, during processing of a current section, at the end of a processing unit,
determining that processing has crossed into a next section; and
continuing to process data in the next section.

13. The article of manufacture of claim 8, wherein the operations further comprise:
when restarting loading of the processed data, skipping a specified number of rows in at least one of the input files.

14. A method for loading input data in one or more hierarchical format input files into a data store, comprising:
generating a map specification that maps input data in the one or more input files to columns of tuples;
performing parallel processing of the one or more input files to output tuples, wherein the parallel processing includes parallel parsing and construction of the tuples using the map specification, including:
receiving a physical input file;
logically dividing the physical input file into multiple sections, wherein each of the multiple sections is an input file; and
while performing processing of a first section from the multiple sections under control of a first row mapper,
determining that there has been an error in logically dividing the physical input file;
continuing processing of a next section from the multiple sections that is also being processed by a second row mapper; and
notifying the second row mapper to terminate processing of the next section; and
serially loading the tuples into the data store while enforcing the order of the data in the one or more input files.

15. The method of claim 14, wherein the tuples output when processing data from each of the input files are appended to a separate temporary storage location and further comprising:
deleting the temporary storage location into which the second row mapper was appending the tuples from the processing of the next section.

16. The method of claim 14, wherein serially loading the tuples further comprises:
loading the tuples without generating SQL commands.

17. The method of claim 14, wherein the tuples output when processing data from each of the input files are appended to a separate temporary storage location and further comprising:

when serial loading is interrupted, restarting the serial loading using the tuples in the separate temporary storage locations without reprocessing the one or more input files.

18. The method of claim 14, wherein the parallel processing is performed by two or more row mappers.

19. A computer system having at least one program for loading input data in one or more hierarchical format input files into a data store, comprising:

generating a map specification that maps input data in the one or more input files to columns of tuples;

performing parallel processing of the one or more input files to output tuples, wherein the parallel processing includes parallel parsing and construction of the tuples using the map specification, including:

receiving a physical input file; and logically dividing the physical input file into multiple sections, wherein each of the multiple sections is an input file; and while performing processing of a first section from the multiple sections under control of a first row mapper, determining that there has been an error in logically dividing the physical input file;

continuing processing of a next section from the multiple sections that is also being processed by a second row mapper; and notifying the second row mapper to terminate processing of the next section; and serially loading the tuples into the data store while enforcing the order of the data in the one or more input files.

20. The computer system of claim 19, wherein the tuples output when processing data from each of the input files are appended to a separate temporary storage location and further comprising:

deleting the temporary storage location into which the second row mapper was appending the tuples from the processing of the next section.

21. An article of manufacture comprising one of hardware logic implementing logic and a computer readable storage medium including a program for loading input data in one or more hierarchical format input files into a data store, wherein the logic or program causes operations to be performed, the operations comprising:

generating a map specification that maps input data in the one or more input files to columns of tuples;

performing parallel processing of the one or more input files to output tuples, wherein the parallel processing includes parallel parsing and construction of the tuples using the map specification, including:

receiving a physical input file;

logically dividing the physical input file into multiple sections, wherein each of the multiple sections is an input file; and while performing processing of a first section from the multiple sections under control of a first row mapper, determining that there has been an error in logically dividing the physical input file;

continuing processing of a next section from the multiple sections that is also being processed by a second row mapper; and notifying the second row mapper to terminate processing of the next section; and serially loading the tuples into the data store while enforcing the order of the data in the one or more input files.

22. The article of manufacture of claim 21, wherein the tuples output when processing data from each of the input files are appended to a separate temporary storage location and wherein the operations further comprise:

deleting the temporary storage location into which the second row mapper was appending the tuples from the processing of the next section.

23. The article of manufacture of claim 21, wherein the operations for serially loading the tuples further comprise:

loading the tuples without generating SQL commands.

24. The article of manufacture of claim 21, wherein the tuples output when processing data from each of the input files are appended to a separate temporary storage location and wherein the operations further comprise:

when serial loading is interrupted, restarting the serial loading using the tuples in the separate temporary storage locations without reprocessing the one or more input files.

25. The article of manufacture of claim 21, wherein the parallel processing is performed by two or more row mappers.

* * * * *